(12) United States Patent
Aviv et al.

(10) Patent No.: US 9,135,627 B2
(45) Date of Patent: Sep. 15, 2015

(54) METHOD AND SYSTEM FOR ON-LINE SURVEY RECRUITMENT

(75) Inventors: Ronit Aviv, Holmdel, NJ (US); Gennady Feldman, Brooklyn, NY (US)

(73) Assignee: Dynamic Logic, Inc., New York, NY (US)

( * ) Notice: Subject to any disclaimer, the term of this patent is extended or adjusted under 35 U.S.C. 154(b) by 2467 days.

(21) Appl. No.: 11/775,997

(22) Filed: Jul. 11, 2007

(65) Prior Publication Data

US 2009/0018893 A1      Jan. 15, 2009

(51) Int. Cl.
*G06Q 10/00* (2012.01)
*G06Q 30/00* (2012.01)
*G06Q 30/02* (2012.01)

(52) U.S. Cl.
CPC ............ *G06Q 30/02* (2013.01); *G06Q 30/0203* (2013.01)

(58) Field of Classification Search
CPC ............................ G06Q 30/02; G06Q 30/0203
USPC ........................................................... 705/10
See application file for complete search history.

(56) References Cited

U.S. PATENT DOCUMENTS

| | | | |
|---|---|---|---|
| 5,724,521 A | 3/1998 | Dedrick | |
| 5,794,210 A | 8/1998 | Goldhaber et al. | |
| 5,838,790 A | 11/1998 | McAuliffe et al. | |
| 5,848,397 A | 12/1998 | Marsh et al. | |
| 5,918,014 A | 6/1999 | Robinson | |
| 5,948,061 A | 9/1999 | Merriman et al. | |
| 5,956,709 A | 9/1999 | Xue | |
| 6,006,197 A | 12/1999 | d'Eon et al. | |
| 6,009,410 A | 12/1999 | LeMole et al. | |
| 6,070,145 A | 5/2000 | Pinsley et al. | |
| 6,138,155 A | 10/2000 | Davis et al. | |
| 6,199,106 B1 | 3/2001 | Shaw et al. | |
| 6,366,298 B1 | 4/2002 | Haitsuka et al. | |
| 6,662,192 B1 | 12/2003 | Rebane | |
| 7,010,497 B1 * | 3/2006 | Nyhan et al. ................ | 705/14.44 |
| 2002/0002482 A1 | 1/2002 | Thomas | |
| 2002/0128898 A1 * | 9/2002 | Smith et al. ..................... | 705/10 |
| 2004/0093261 A1 | 5/2004 | Jain et al. | |

(Continued)

FOREIGN PATENT DOCUMENTS

| | | |
|---|---|---|
| EP | 0875843 A1 | 11/1998 |
| WO | WO 97/22074 A1 | 6/1997 |

(Continued)

OTHER PUBLICATIONS

International Search Report and Written Opinion for PCT/US2008/69815 dated Oct. 6, 2008.

(Continued)

*Primary Examiner* — Stephanie Delich
(74) *Attorney, Agent, or Firm* — Leydig, Voit & Mayer, Ltd.

(57) ABSTRACT

A system and method are disclosed for presenting on-line survey invitations to users over a network. The system selectively presents survey invitations to users in accordance with a survey recruitment definition associated with a tag embedded within a Web page (node) downloaded and executed on a user computer. A particular survey is selected from a set of presently active surveys applied by a survey logic server to received requests based upon a category (node ID) provided by a user computer in accordance with the execution of logic contained in the survey recruitment definition.

24 Claims, 4 Drawing Sheets

(56) References Cited

U.S. PATENT DOCUMENTS

2004/0210820 A1   10/2004   Tarr et al.
2005/0132267 A1*   6/2005   Aviv ........................ 715/500.1
2008/0294523 A1*   11/2008   Little ............................ 705/14
2008/0313010 A1*   12/2008   Jepson et al. ................... 705/10

FOREIGN PATENT DOCUMENTS

WO   WO 97/26729   7/1997
WO   WO 97/40514 A1   10/1997

OTHER PUBLICATIONS

Ipsos-ASI The Advertising Research Company, *Vendor Background*; Apr. 5, 2000; pp. 1-30.
*New Service Rewards Users for Viewing Web Ads*, Gale Group Newsletter DB: Jun. 18, 1996.
Dysart, *Interactive the Web's New Standard*, Nov. 1998, pp. 30-36.
"Regulations Needed for Children's Web Sites," Newsbytes News Network, P N?A: Jun. 16, 1997.
European Patent Office, extended European Search Report in corresponding European Patent Application No. 08781711.0 dated Apr. 27, 2012.

* cited by examiner

| Participants Needed Counter(s) (exposed/control) 20 | Survey Creative URL 22 | Survey Invitation Click-through URL 24 |

METHOD AND SYSTEM FOR ON-LINE SURVEY RECRUITMENT

TECHNICAL FIELD

The invention relates generally to on-line survey recruitment methods and systems and, more particularly, to integrated systems for supporting selection of on-line surveys for presentation to on-line users according to dynamic survey participant lists and identification information provided by on-line users. Survey invitations are initially submitted and, if accepted, then followed by a survey potentially determined according to the identification information.

BACKGROUND

Businesses have increasingly discovered that the Internet can be an effective forum for recruiting participants for the purpose of executing a survey. Rather than rely upon in-person solicitations on the street and in shopping malls, a variety of survey services leverage Web-enabled survey solicitation mechanisms. Such survey solicitation mechanisms, often in the form of pop-up windows, seek willing survey participants from the millions of user's surfing the Internet on a daily basis. The purpose and subject-matter with which the surveys are associated (e.g., products, services, opinions, political views/elections, sporting events, health, etc.) is virtually limitless.

A particular example of on-line survey fulfillment services involves surveying users that have been exposed to a particular on-line advertisement (as well as those that have not) to gauge the effect/impression of the ad on the users. In addition to being a good advertising forum, the Internet has also proven to be a convenient and source of consumer survey participants to assess the impact of particular Internet advertising campaigns on exposed users.

Recruiting users to take surveys can be a challenging task. U.S. Pat. No. 6,070,145, entitled "RESPONDENT SELECTION METHOD FOR NETWORK-BASED SURVEY" proposes a method in which visitors to a Web site are randomly chosen to be solicited to take an on-line survey. If a visitor is chosen, then a graphic image soliciting the visitor to take the survey is transmitted from a surveyor to the Web site being visited. The image is then displayed to the visitor. If the visitor is not chosen, then a dummy image is displayed.

Another survey method is described in U.S. Pat. No. 7,010,497, entitled "SYSTEM AND METHOD FOR EVALUATING AND/OR MONITORING EFFECTIVENESS OF ON-LINE ADVERTISING." The method described therein involves determining whether a user has been exposed to an on-line ad by checking cookies stored on the user's computer. Based, at least in part, on this determination, a decision is made as to whether or not to solicit the user to take an on-line survey.

U.S. patent application Ser. No. 09/900,674, filed Jul. 6, 2001, entitled "Method and System for Conducting An On-Line Survey," describes yet another way to carry out on-line surveys. In that system, in response to receiving a request for a block of data from a user's computer, a determination is made whether the user has previously been solicited to take an on-line survey. Thereafter, computer-readable instructions are returned with the requested block of data that facilitate invoking a procedure for soliciting the user to take an on-line survey.

Another known survey recruitment scheme involves a variety of data and logic that acts upon the data. For example, a survey recruitment scheme often specifies a number of survey takers needed to complete the survey as well as the characteristics (including ad exposure) of the survey participants. Such information is used to guide whether an individual user, having particular traits, is recruited to take a particular survey. In known systems, such as the one described in the aforementioned U.S. patent application Ser. No. 09/900,674, a considerable amount of communications are potentially required between multiple servers and databases to administer recruitment of survey participants.

SUMMARY OF THE INVENTION

A method and system for recruiting on-line survey participants is provided that facilitates recruiting on-line survey participants according to established categories. The disclosed system exhibits reduced reliance upon remotely executed logic.

In particular, a method and system for administering on-line surveys are presented herein wherein a survey recruitment tag is inserted within a Web page delivered to a user computer. The tag references an on-line survey recruitment definition. The survey recruitment definition includes, for example, computer executable instructions embodying decision logic. Thus, when processed by the user computer, the tag initiates downloading the decision logic, from a server, for execution upon the user computer to determine whether the user computer will launch an invitation to take an on-line survey.

The present invention contemplates a variety of server arrangements for managing/maintaining and delivering the survey recruitment definitions to the user computer in a manner that generally ensures fresh/updated definitions while reducing network traffic and disruption to web servers. In a particular embodiment, the server is a content delivery network server containing one of potentially multiple replicated copies of the survey recruitment definitions. In a particular embodiment, the server is separate and distinct from a survey list server that manages (creates/incorporates changes to) active survey lists and the recruitment definitions. After providing an initial copy of the survey recruitment definition, the survey list server updates the survey recruitment definition (e.g., on an as-needed basis).

In a particular embodiment, decision logic within the survey recruitment definition, when executed on a user computer, accesses information indicative of a Web page type associated with the Web page containing the survey recruitment tag to determine a category that is subsequently utilized by survey selection logic that selects one of multiple available surveys. Such information is, for example, a Web page's domain name or a class ID assigned to the page. Additionally, a category is potentially specified explicitly within the Web page. The category, in various embodiments is directed to a type of Web page, a type of survey, and/or a type of user that typically accesses the page.

In an exemplary embodiment, a survey logic server applies a list of active surveys provided by the survey list server to render decisions regarding whether to issue a survey invitation to a user computer. In the exemplary embodiment, the user computer, upon determining a category, provides the category to the survey logic server. Thereafter, the survey logic server applies the category to the list of currently active surveys (provided by the survey list server) and selects one of the active surveys for presentation to the user in response to the user accepting an invitation to take the survey).

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1A:
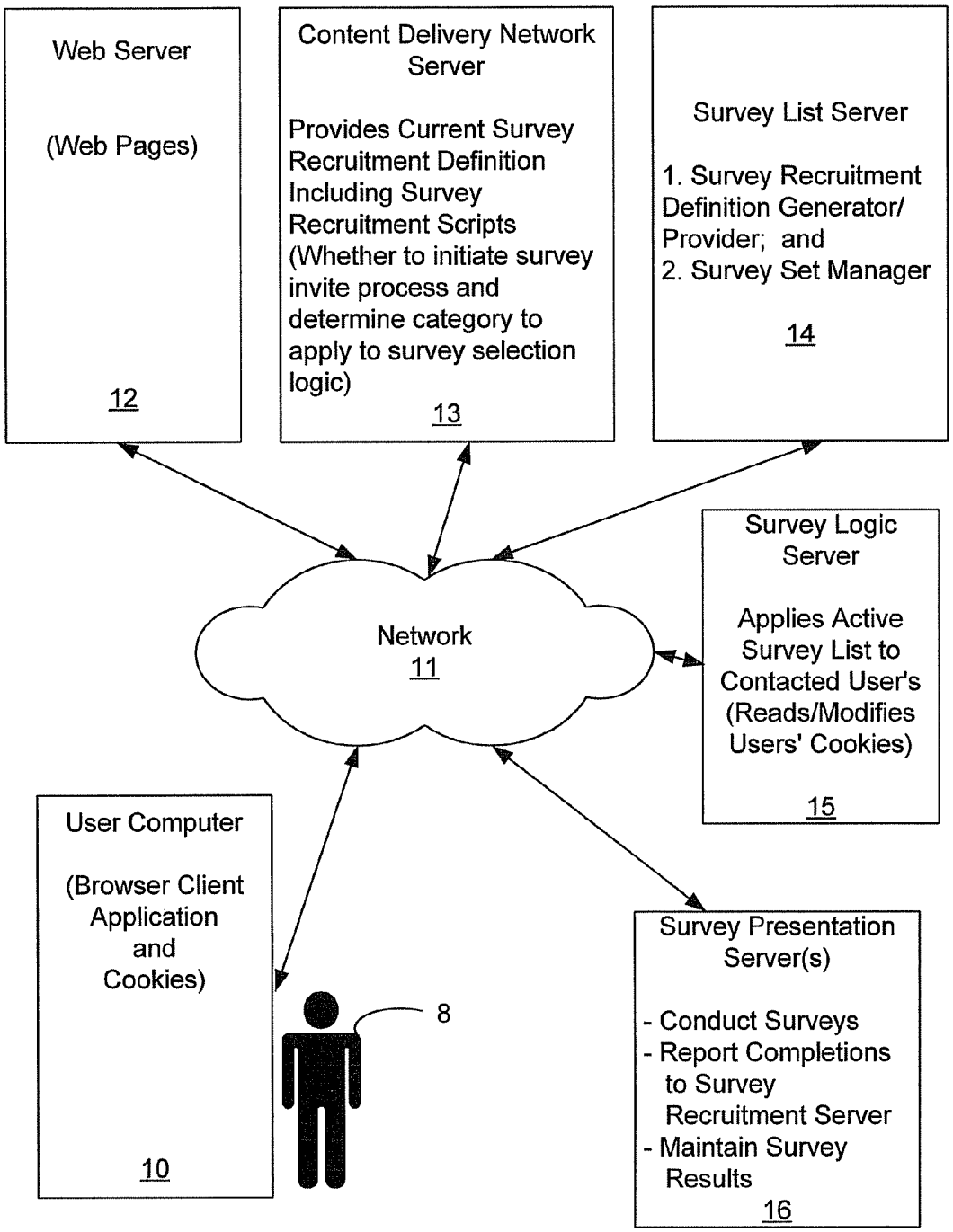
FIG. 1A is a block diagram generally illustrating an example network environment in which an embodiment of the invention is used.

Turning to FIG. 1A, an exemplary general network environment is depicted that is suitable for carrying out selectively recruiting a user to take an on-line survey via the Internet in accordance with a survey recruitment definition downloaded and executed upon a user computer 10 that receives and processes Web pages provided by a Web server 12. In the exemplary network environment the user computer 10 associated with a user 8 executes a browser client application including extensions for executing JavaScript associated with Web pages downloaded from the Web server 12 via a network 11 (e.g., the Internet). A Web page delivered by the Web server 12 to the user computer 10 includes a survey recruitment definition tag that is processed by the browser client application after receipt by the user computer 10 to initiate downloading and processing the survey recruitment definition provided by a content delivery network server (e.g., content delivery network server 13) to the user computer 10.

In an exemplary embodiment, survey recruitment definitions are centrally administered by a survey list server 14. The survey list server 14 generates the survey recruitment definitions including recruitment scripts for determining whether to initiate a survey invitation process. The survey list server 14 thereafter provides the scripts to the content delivery network server 13. The survey list server 14 also manages a set of presently active surveys (including designating a particular survey for a user) that are utilized by a survey logic server 15 to assign a survey to a particular requesting user. The operation of the survey list server 14 and the survey logic server 15 is described further herein below.

Web pages containing a survey recruitment definition tag downloaded by Web servers (e.g., Web server 12) to user computers (e.g., user computer 10) are referred to herein as survey recruitment 'nodes'. Furthermore, a node is associated with one or more node IDs. The node IDs are utilized by survey selection logic to guide selection of a survey from a set of presently active surveys managed by the survey list server 14 and applied by the survey logic server 15. By way of example, the node ID corresponds to a 'category' of Web pages. A category comprises a logical grouping of Web pages according to any of a variety of grouping criteria including, for example: site type, page content type, typical audience, etc. Therefore, a node ID is generally not unique to a particular Web page. In exemplary embodiments a node ID is explicitly designated for a Web page downloaded from the Web server 12 and/or, alternatively, derived from information associated with the page (e.g., a Web site containing the downloaded Web page).

In an exemplary embodiment the user computer 10 provides a node ID associated with a downloaded node (Web page) to the survey logic server 15. The survey selection logic on the survey logic server 15 thereafter applies the node ID to a set of presently active on-line surveys managed by the list server 14 to select a particular one of the currently active on-line surveys for which an invitation is submitted to a user via the user computer 10. Upon completion of the selection process, the logic server 15 returns, to the user computer 10, a reference (e.g., a URL) corresponding to a survey selected from the set of active on-line surveys. An exemplary survey selection process is described herein below with reference to FIGS. 3 and 4.

Concentrating the survey selection logic at the logic server 15, which is in close communication with the survey list server 14, enables virtually instantaneous implementation of changes to the survey lists when executing survey selection logic. However, in an alternative embodiment, both the survey lists and the survey selection logic are both passed by the list server 14 to the content delivery network server 13 for download to the user computer 10 upon request. The alternative arrangement potentially reduces workload on the survey logic server 15. However, the validity (accuracy) of the survey lists can potentially decrease due to delays in propagating changes to the survey lists from the list server 14 to the content delivery network server 13.

In the exemplary embodiment, the survey recruitment definition tag contained within a survey invitation logic-enabled Web page (node) delivered by the server 12 to the computer 10 comprises a relatively simple one-line instruction identifying a source of a survey recruitment definition. While a variety of forms for the tag are contemplated, in a particular example, the survey recruitment definition tag comprises a single-line JavaScript instruction containing a URL. The URL corresponds to the survey recruitment definition stored upon, and provided by, a content server such as, for example, the content delivery network server 13. In an exemplary embodiment, the content delivery network server 13 is, by way of example, one provided by Akamai Technologies, Inc. Such content delivery networks are relatively well known for providing content via a set of distributed/replicated copies of specified content. Furthermore, since the tag is a reference to the location of the survey recruitment definition, the survey recruitment definition can be changed (e.g., updated to include a new/updated survey recruitment script) without having to change the survey recruitment tag embedded in a Web page (node). Thus, the survey recruitment definition tag embedded within pages downloaded by the Web server 12 is relatively static and need not be updated unless the reference generically identifying the survey recruitment definition needs to be changed. Since the survey recruitment definition source is not dependent upon the content of the survey recruitment definition itself, modifying the survey recruitment definition does not necessitate changing the embedded survey recruitment definition tag contained within a node.

The Web page containing the survey recruitment definition tag is processed, for example, by a browser operating on the user computer 10. In association with processing the tag, the user computer 10 initiates loading a survey recruitment definition provided by the content delivery network server 13. As noted in FIG. 1A, the survey recruitment definition provided via the content delivery network server 13, by way of example, includes a survey recruitment script.

In an exemplary embodiment, the survey recruitment script performs a generally brief set of operations before sending a request for a survey invitation to the survey logic server 15 (specifying a category/Node ID). The survey recruitment script includes, by way example, a first portion that implements a request throttling mechanism. The throttling mechanism applies a tag rate (corresponding to a probability factor) to a randomly generated number to determine whether to send a survey invitation request to the logic server 15. For example, a tag rate of '1' indicates a 100 percent transmission rate (guaranteeing transmission). A fractional value (less than one) specified by the tag rate corresponds to the intended probability for transmitting a request to the logic server 15. Thus a tag rate of '0.1' results in a 10 percent probability of transmitting the request when the associated page is downloaded to a user computer. A tag rate of '0' excludes the node (Web page) from the survey invitation process.

In an exemplary embodiment, the tag rate is included in the survey recruitment script downloaded from the content delivery network server 13. The tag rate thus facilitates controlling how often certain pages, when downloaded, actually result in calls from the user computer 10 to the survey logic server 15 to commence the survey selection process. By way of example, a low tag rate is assigned to a node that is often downloaded to a user computer (e.g., one frequently selected as a home page or frequently visits—such as a Web portal site).

A second portion of the downloaded script from the content server 13 determines a category/node ID to submit to the survey logic server 15. By way of example, the category/node ID is generated based upon a web site with which the downloaded Web page form the server 12 is associated. Alternatively, the Web page itself specifies a category ID that directly specifies the node ID for a Web page or indirectly specifies a sub-category from which a more generalized node ID is determined.

It is noted that the set of surveys administered by the survey list server 14 is not limited to surveys associated with particular products/services associated with advertisers. By way of example, a "catch-all" list entry, for which all users are eligible, is placed at the end of the survey list. Respondents to the catch-all survey invitation are asked, by way of example, a set of demographic questions such as: age, gender, income, and education. Such list provides two potentially valuable types of information: (1) it provides a gauge of the ability to recruit survey participants on the particular node (survey-enabled Web page) over, for example, the course of a day; and (2) it potentially provides an indication of the type of user that accesses the page.

The described functionality of the survey list server 14 and the survey logic server 15 is implemented, in executable software modules and hardware, in potentially many different ways in accordance with alternative embodiments. The survey list server 14 and the survey logic server 15, though schematically presented in FIG. 1A as two separate entities, are described separately for purposes of identifying their distinct, yet closely related, functions. There is no intention to limit the manner in which the survey list server 14 and survey logic server 15 are carried out in server software and hardware. For example, in an illustrative alternative embodiment, the survey logic server 15 and survey list server 14 are provided as a single, multi-function, server (supporting the functionality of the survey list and survey logic servers) operating from a single physical network address. In another illustrative embodiment, both the survey logic server 15 and survey list server 14 are embodied in two distinct server applications that reside at a same network address.

Figures 1B, 2:
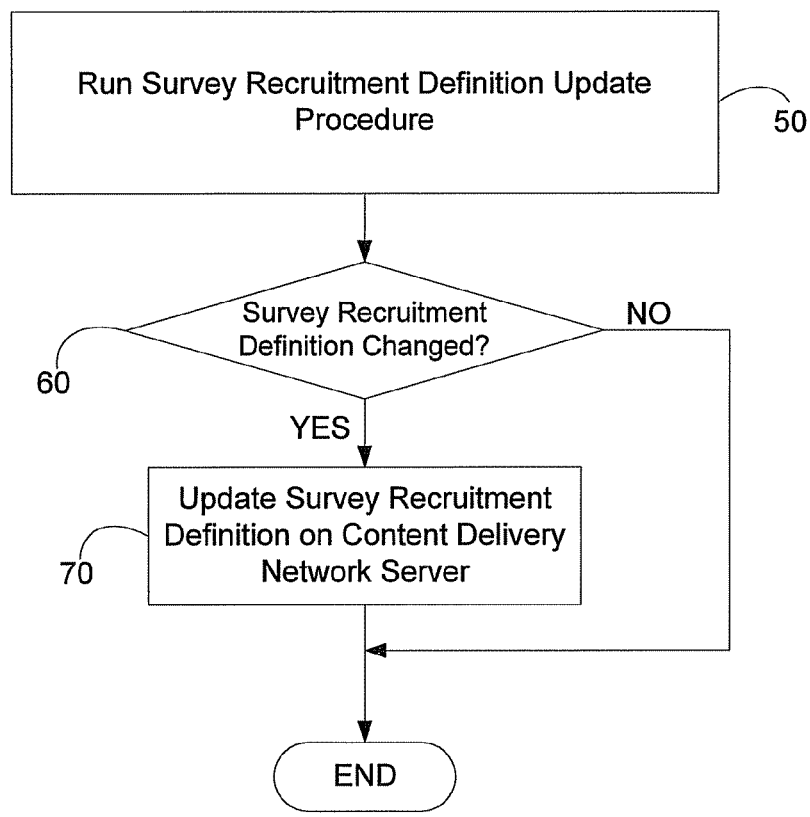
FIG. 1B schematically depicts a set of fields in an exemplary survey list entry.
FIG. 2 summarizes an update procedure carried out between a survey recruitment definition generator/provider and a content delivery network service/server.

The survey list server 14 maintains/manages a listing of a set of currently active on-line surveys. Turning briefly to FIG. 1B, an exemplary survey list entry is schematically depicted. In the case of surveys based on on-line advertisements, the specification of survey participant needs are generally divided, for each listed survey, between a needed number of control (unexposed) group survey participants and exposed group survey participants. Thus, a survey participants counter field 20 specifies one or more count values representing the number of surveys that are currently needed (as of a last counter update period) to complete a particular campaign. The set of counters in the counter field 20 include, for example, an exposed user count and a control user count. A survey creative URL field 22 specifies a web page for presenting a survey invitation. Thus, each survey is potentially capable of specifying its own survey invitation page. A click-through URL field 24 specifies a Web page that is accessed in the event that a user accepts the invitation to take the survey represented by the survey entry.

In an exemplary embodiment, survey selection logic is executed/processed, by way of example, on the survey logic server 15 in response to a request from the user computer 10 as a result of executing the survey recruitment definition downloaded from the content delivery network server 13. The survey logic server 15 determines whether to present a survey invitation to a user via the user computer 10. The survey logic server 15 also determines a particular survey to be presented, from a list of currently active surveys generated by the survey list server 14 for the survey logic server 15. Thus, in accordance with an exemplary embodiment (see FIG. 4 described herein below), the survey selection logic executed by the survey logic server 15 includes logic for selecting a particular survey based, at least in part, upon the node ID provided by the user computer 10 in association with processing of the survey recruitment definition downloaded from the content server 13. As noted previously herein above, the node ID corresponds to a category derived from many potential sources of information including: a node ID directly specified by a Web page from the Web Server 12, a domain (e.g., "ESPN.com") specified in the URL of the Web page, or other characterizing information (e.g., a class code/ID) associated with the downloaded Web page containing the survey recruitment definition tag. The survey request and selection procedure occurs without any visual indication to a user by the user computer 10 that the survey selection process is taking place.

The survey selection logic executed by the survey logic server 15 also potentially includes instructions that facilitate accessing cookies on the user computer 10 identifying on-line advertisements that were previously executed on the user computer 10 (or virtually any type of information stored within cookies managed by the survey logic server 15 on a user's computer that might aid matching the user to an appropriate one of a set of potentially available surveys) to guide decision-making with regard to whether to present an invitation to take an on-line survey, and identifying a particular one of the set of candidate surveys. The choice of the particular survey is also potentially determined by a variety of factors relating to the surveys/invitations including: evidence of exposure to particular surveys, recent invitations to take a survey that were declined, and previous presentation and/or completion of on-line surveys.

In the illustrative embodiment the survey list server 14 manages the content of the survey recruitment definition provided by the content delivery network server 13 (see, e.g., FIG. 2 described herein below). In an exemplary embodiment, the survey recruitment definition comprises decision logic that determines whether to contact the logic server 15 and designates a node ID (category) included in the request.

The survey list server 14 determines whether any survey recruitment definitions need to be updated on the content server 13, and updates the survey recruitment definition on the content delivery network server 13 on an as-needed basis.

Locally, the survey list server 14 determines current survey needs (e.g., currently requested surveys and user types/profiles) and updates its survey list accordingly. In addition to adding and removing surveys from the list, the survey list server 14 modifies the types of desired profiles (e.g., exposed/control for particular ads, domain name, categories, etc.) for which surveys need to be completed. The decision process associated with execution of the survey recruitment definition is discussed further herein below with reference to FIG. 3.

It is noted that the content server functionality (for delivery of the survey recruitment definition to the user computer 10) can be implemented in a variety of server arrangements. The arrangement depicted in FIG. 1A includes a content delivery network server 13, separate and distinct from the survey list server 14, for carrying out the content server functionality. However, in an alternative embodiment, the content delivery functionality is incorporated into the survey list server 14. Furthermore, each of the roles (e.g., definition generator/provider, survey set manager, etc.) identified for the survey list server 14 in FIG. 1A are potentially distributed among multiple servers. Other server arrangements are contemplated for creating, managing (both defining and applying), and delivering survey recruitment definitions in accordance with yet other alternative embodiments.

If the survey logic server 15 determines that a current user is eligible to take a survey, then the logic server 15 returns a URL with which the invitation is associated to the user computer 10, and a survey invitation is subsequently presented on the user computer 10. If the user indicates a willingness to take a survey by, for example, clicking on an invitation window displayed on the user computer 10, then a survey server, of a set of survey presentation servers 16, is contacted based upon a click-through URL (see, e.g., click through URL 24 in FIG. 1B) specified by the associated list entry, and the requested survey session is commenced. Upon successful completion of the survey session, the survey list server 14 receives a notification of the completion as well as any relevant information used to update a corresponding record for an on-line survey in the set of presently active on-line surveys. For example, the survey list server 14 removes a survey from the set of survey entries when a sufficient number have been completed.

Turning briefly to FIG. 2, a flowchart summarizes an exemplary survey recruitment update procedure performed by the survey list server 14 and the content delivery network server 13 on a periodic basis. In response to an event, such as a change to one of the survey recruitment definitions maintained by the content delivery network server 13 or an expiration of a period of time since a last update process was performed, during step 50 the survey list server 14 commences a survey recruitment definition update process for generating a potentially new survey recruitment definition in view of changes to one or more survey recruitment definitions since a last survey recruitment definition was generated and provided by the list server 14 to the content delivery network server 13. In an exemplary embodiment, the survey list server 14 accumulates information relating to survey recruitment definitions over a prescribed wait period between survey recruitment definition update cycles. Alternatively, the event triggering execution of step 50 is, for example, a change to any one of a set of surveys recruitment definitions. Thus, the trigger for commencing step 50 can differ substantially in accordance with alternative embodiments of the invention.

Upon completing the definition update step 50, control passes to step 60. If at step 60 the definition rendered during step 50 is the same as a definition currently deployed on the content delivery network server 13 (i.e., the definition has not changed), then no further action is needed and control passes to the End (or alternatively a simple "heartbeat" message is sent to the content delivery network server 13 indicating no changes are needed). Otherwise, if the new definition rendered during step 50 differs from the currently deployed definition, then control passes from step 60 to step 70 wherein the content delivery network server 13 is provided the new survey recruitment definition generated by the survey list server 14 during step 50.

It is further noted that the update mechanism can vary in many respects in accordance with various embodiments of the invention. For example, the steps of calculating a new definition on the survey list server 14 and updating the definition on the content server 13 can be disassociated and run as two independently triggered processes. Thus, in an exemplary alternative embodiment, the survey definition is updated immediately upon receiving new information, but sending a current/updated survey definition to the content delivery network server 13 is carried out in response to a periodic timer (e.g., every 10 minutes). Thus, the exemplary steps depicted in FIG. 2 are not intended to be limiting with regard to the present invention.

Accuracy of survey lists is important to avoid over-participation in survey campaigns. Therefore, by way of example, when the survey list server 14 updates the list of currently active surveys to remove or add a survey (or category of needed participant for a survey), the new survey list is made available to the survey logic server 15 without waiting for expiration of a periodic timer.

Figure 3:
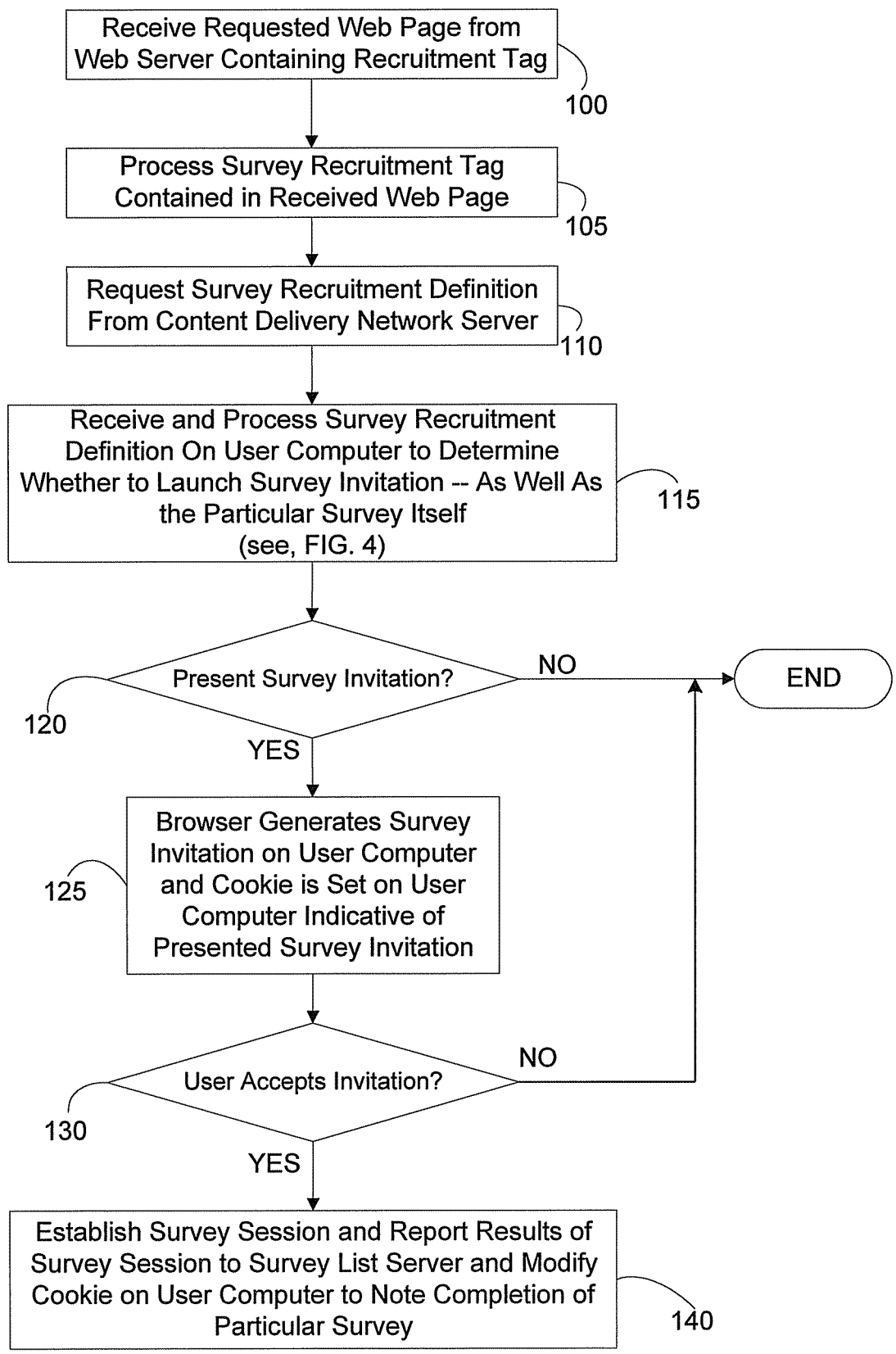
FIG. 3 is a flowchart depicting a set of exemplary steps for downloading and applying a survey recruitment definition in association with a survey recruitment and execution plan.

Having described an exemplary network environment and dynamic survey recruitment definition update mechanism for carrying out an exemplary embodiment of the present invention, attention is directed to FIG. 3 that summarizes a set of steps associated with, among other things, determining whether to present an invitation to take a survey, and which one of the survey invitations to present on the user computer 10. Initially, during step 100, the browser running on the user computer 10 receives a requested Web page (node) from the Web server 12 that contains the aforementioned survey recruitment definition tag. In an exemplary embodiment, the Web page/node is an HTML document.

During step 105, the browser encounters and processes the survey recruitment definition tag embedded within the received Web page. As previously explained, the survey recruitment tag references a survey recruitment definition provided by the content delivery network server 13. In accordance with processing the tag, during step 110, the browser on the user computer 10 requests the survey recruitment definition referenced in the tag.

During step 115 the requested survey recruitment definition is received and processed by the user computer 10. Thereafter, the user computer 10 executes a script containing decision logic to determine (in association with the survey logic server 15) whether to present a survey invitation to the user 8 via the browser's user interface. While an exemplary decision-making procedure is described in detail in association with FIG. 4, in general, during processing of the survey recruitment definition the user computer 10 initially performs a threshold test based upon a provided tag rate specifying, for example, a probability that a given page hit will result in a request being sent from the user computer 10 to the survey list server 14 for a survey invitation. Other tag rate-based threshold tests are contemplated as well, including a simple modulo N counter. When the counter reaches N (page hits by the user), the threshold is reached and the counter resets. If the threshold test is passed, then further script is executed on the user computer to notify the survey logic server 15 and provide an appropriate node ID (identifying a category with which the previously downloaded Web page is associated). The survey logic server 15, in response to the request from the user computer 10 including the node ID, consults a variety of pieces of information and potentially exchanges communications with other networked computers (including requesting cookie information from the requesting user computer 10) to determine whether to generate a particular survey invitation. In addition to the node ID, information accessed to select a particular survey potentially includes, for example: a listing of surveys for which participants are needed, the nature/type of the downloaded Web page containing the tag, data stored on the user computer (e.g., cookies) indicative of previous on-line advertisement exposure, previous invitations to take a survey, and previously completed surveys.

Furthermore, in an illustrative embodiment, if multiple surveys are available, then a particular one of the surveys is selected as well during step 115. Factors that affect the determination of the particular survey include, for example: the domain of the downloaded Web page, the node ID assigned to the page, survey priority (including dynamically updated priorities arising from upcoming completion deadlines), advertisement exposure, previously declined invitations to take a survey, etc During step 120, if processing the survey recruitment definition during step 115 resulted in a decision not to present a survey invitation to a current user of the computer 10, then control passes to the End. Otherwise, control passes from step 120 to 125. During step 125 the browser generates a survey invitation on the user computer 10. In an exemplary embodiment, the survey invitation is a pop-up window specified in the survey creative field 22 of the survey definition of a selected listed survey entry from the set of currently active surveys. However, a variety of ways for accessing and presenting survey invitations on the user computer 10 are contemplated in various exemplary embodiments.

Furthermore, since each survey is capable of specifying its own particular survey creative, the information conveyed in the survey invitation displayed during step 125 can vary. For example, in most cases a "blind" invitation is presented that does not convey any information regarding the nature of the survey that will be provided in response to a user's acceptance of a presented invitation. In other cases, a hint is provided about the nature of a contemplated survey.

Also, during step 125 a cookie is modified on the user computer 10 to indicate the presentation of a survey invitation. In a particular embodiment, the cookie includes a time/date stamp identifying when the invitation was presented on the user computer 10. Other information indicating the particular survey invitation presented is also potentially included in the cookie data stored during step 125.

Next, during step 130, if the user declines the invitation to take a survey, then control passes to the End. Otherwise, if the user accepts the invitation, then control passes from step 130 to step 140. During step 140, the browser on the user computer 10 establishes a session with one of the survey presentation servers 16 (designated by the click-through URL field 24 of a particular survey list entry) to conduct a survey in accordance with a previous selection of a particular survey during step 115. During the course of the survey session, user responses are acquired and stored by the contacted one of the survey presentation servers 16. Upon successful completion of the survey session, the contacted one of the survey presentation servers 16 provides an update, if needed, to the survey list server 14. Such update potentially indicates a new number of participants (of potentially a particular type) that are needed for a particular survey campaign in view of the successful completion of the current survey session with the user 8. Such information generally results in the list server 14 re-calculating its list of currently active surveys. Furthermore, upon completion of the survey, a cookie is modified on the user computer 10 to note the particular survey's completion.

It is noted that, in an exemplary embodiment, the node (survey-enabled Web page) from which a completed survey originated is maintained throughout the course of executing the downloaded logic of the survey recruitment definition. Thus, successful completion of a particular survey and its associated source node are reported to the survey logic server 15.

Figure 4:
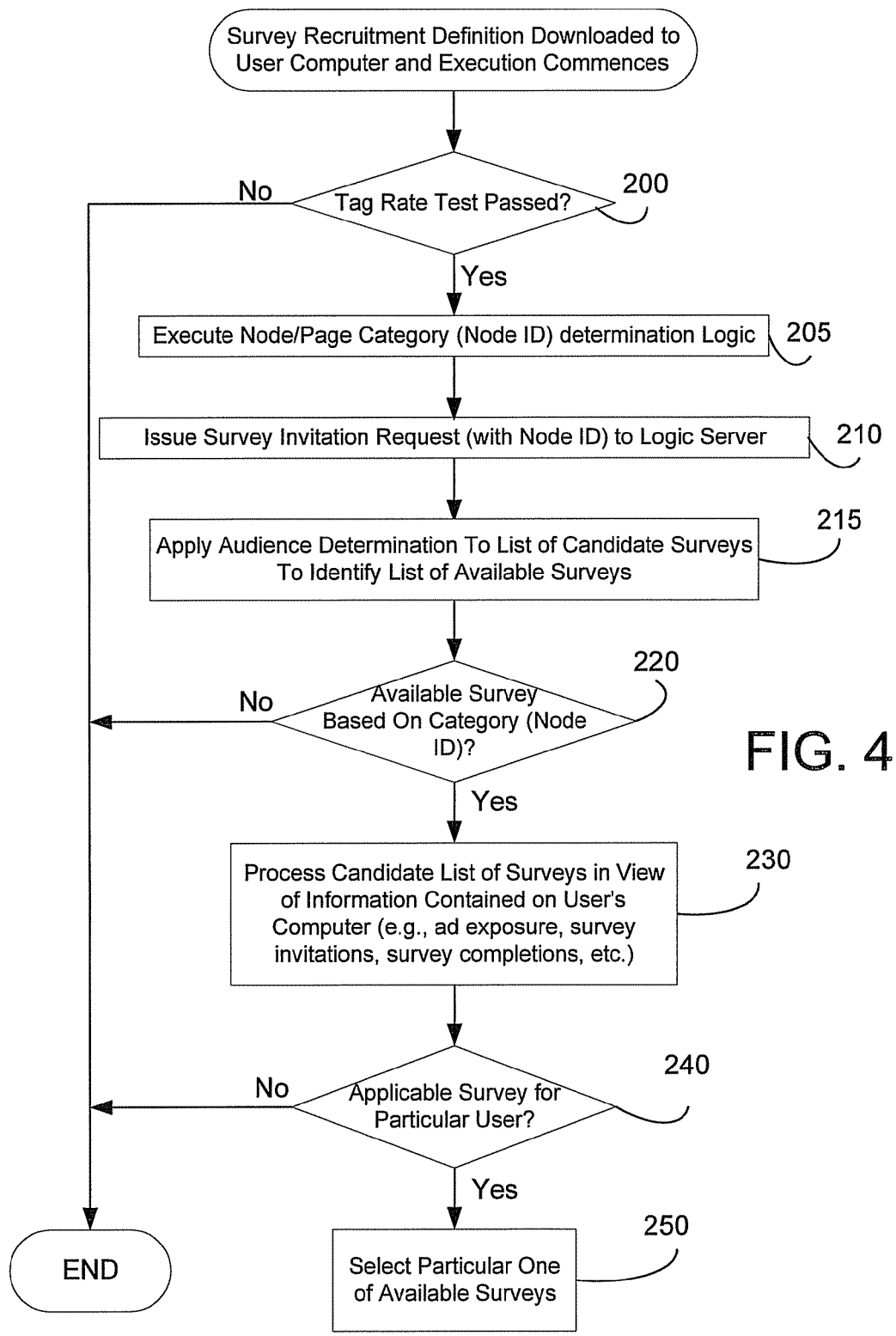
FIG. 4 is a flowchart depicting a set of exemplary steps associated with execution of the downloaded survey recruitment definition on a user computer.

Having described an exemplary general progression of steps associated with a decision process for selectively launching a survey invitation, attention is directed to FIG. 4 that summarizes an exemplary set of steps associated with processing, by the user computer 10 and the survey logic server 15, a downloaded survey recruitment definition during step 115. As noted previously herein above, the survey recruitment definition is dynamically and/or periodically updated at a content server. The current version of the survey recruitment definition is downloaded upon request to the user computer 10 when a Web page (node) containing a survey recruitment definition tag is processed by a browser executing on the user computer 10. Information indicative of the Web page type (e.g., domain name) is potentially used to determine a category (or categories) with which the downloaded Web page (node) is associated. In an exemplary embodiment the node's category is provided by the user computer 10 to the survey logic server 15 in the form of a node ID. The survey logic server 15, in turn, applies the node ID to a set of presently active surveys, calculated by the survey list server 14, to determine which one, if any, of the set of presently active surveys will be presented to a user at the computer 10 (in the event that the user accepts an associated survey invitation).

The node ID which generally defines a category of Web page, and thus the particular applicability/relevance of a particular survey specified in a current survey recruitment definition, is potentially determined, by scripts contained in the downloaded survey recruitment definition that are executed on the user computer 10, in any of a variety of ways including, by way of example: (1) analyzing embedded header/metadata information in the downloaded Web page specifying one or more IDs ("tags") describing the content and/or source of the Web page, (2) one or more node IDs provided in either the downloaded node or the subsequently downloaded survey recruitment definition, and (3) the URL of the Web page (node) indicating a particular domain.

The steps described herein below are executed through the integrated operations of the user computer 10 and the survey logic server 15. The survey recruitment definition logic, comprising JavaScript, is initially executed on a user computer to render a node ID corresponding to a category with which the node (Web page) is associated. However, application of the node ID to a list of presently active surveys is performed upon request by the survey logic server 15.

Turning to the steps summarized in FIG. 4, after the survey recruitment definition is downloaded to the user computer 10 the embedded logic (random request generator) and data (e.g., node ID) to render a decision regarding whether to present an invitation to take a survey as well as the particular survey that will be presented in the event that the user accepts the invitation. During step 200 the executable logic initially applies the specified tag rate to a random number generator to perform a threshold test for contacting the survey logic server 15 with a request for a survey invitation. If the tag rate test fails, then control passes to the end (the logic server 15 will not be contacted). However, if the tag rate test is passed, then control passes to step 205.

During step 205 additional logic in the downloaded survey recruitment definition is executed by the user computer 110 to determine a category (node ID) for the node. The node ID determination step, described previously herein above, is potentially based upon a variety of information sources associated with the node including: a node ID explicitly provided in the downloaded Web page from the Web server 12 or in the downloaded survey recruitment definition provided by the content server 13, a URL of the node (e.g., the Web page's domain), tags embedded in the node, etc. Any other information provided in the URL or the Web page itself is potentially used to determine the subject of the page and an appropriate category.

Thereafter, at step 210 the user computer 10 issues a survey invitation request to the survey logic server 15 that includes the node ID. The node ID guides the selection of appropriate surveys from a list of currently active surveys maintained by the logic server 15.

After receiving the request, during step 215 the survey logic server 15 applies the node ID in the request to a set of presently active surveys to identify a set of potentially applicable surveys.

Thereafter at step 220 if no applicable surveys are identified based upon the target audience, then control passes to the End. If however, at least one potentially applicable survey is identified, then control passes from step 220 to step 230 where additional survey selection logic is executed in view of information contained on the user computer 10 (e.g., cookies) to determine a survey, if any, of the surveys for which a survey invitation will be presented. By way of example, cookie data on the user computer 10 is accessed that includes a potentially wide variety of information associated with a decision to present a particular survey to a user. The cookie information identifies, for example: on-line advertisement exposure, previous survey invitations, previous survey participation/completion, user characteristics, etc. The ad exposure information is used to meet particular control/non-control group survey needs specified by the particular survey definition. The survey invitation information is used, for example, to limit repeated invitations within a specified period of time. The survey participation/completion information is used, for example, to ensure that users only complete one of any particular survey. It is noted that, in an exemplary embodiment, the cookie data is managed by the survey logic server 15. The survey logic server 15 accesses the contents of a cookie on the user computer 10 describing previous on-line advertisement exposure, previous invitations, etc.

Thereafter, at step 240, if all of the potentially applicable surveys are disqualified in view of the selection logic applied to the user computer data and survey needs data during step 230, then control passes to the End. If however, at least one applicable survey is identified, then control passes to step 250 wherein the survey selection logic chooses a particular one of the available surveys for which a survey invitation will be presented on the user computer 10. The logic and data for selecting a particular one of the available surveys varies between embodiments. The decision is made, for example, based upon a ranking of the priorities of the surveys. The priorities themselves are, for example, based upon time remaining to complete a particular number of surveys. In other embodiments, the decision between multiple applicable surveys is guided by particular information provided on the user computer 10 such as exposure to particular on-line advertisements or previously declined invitations to take particular surveys. Upon completion of step 250, a particular survey has been identified based upon the previously downloaded survey recruitment definition from the server 13, the category (node ID) with which the originally downloaded Web page (node) is generally associated, a list of currently active surveys managed by the survey list server 14, and information stored on the user computer 10. The survey logic server 15 returns an appropriate survey invitation link to the requesting user computer 10.

Thereafter, the user computer 10 presents an appropriate survey invitation that can be a generic invitation (without contacting a particular survey server) or a specific invitation (based upon an invitation window downloaded, for example, from a particular survey server).

It can thus be seen that a new and useful method and system for recruiting and conducting an on-line survey have been provided. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrative embodiment shown in software, comprising computer-executable instructions stored on computer-readable media, may be implemented in hardware and vice versa or that the illustrative embodiment can be modified in arrangement and detail without departing from the spirit of the invention. Therefore, the invention as described herein contemplates all such embodiments as may come within the scope of the following claims and equivalents thereof.

What is claimed is:

1. A method for administering on-line surveys on a network including a source of downloadable survey recruitment definitions and a user computer, the method comprising:

receiving, by the user computer, a Web page including a survey recruitment tag;

acquiring, by the user computer in accordance with processing the survey recruitment tag of the received Web page, a survey recruitment definition, from a networked server, wherein the survey recruitment definition includes executable logic for requesting a survey invitation;

executing, by the user computer, the survey recruitment definition and issuing a request to a survey logic server to specify a survey invitation, wherein the request to the survey logic server identifies a category; and receiving, by the user computer, the survey invitation, the survey invitation being determined by the survey logic server based upon the category specified in the request and a set of presently active surveys.

2. The method of claim 1 wherein the executing step comprises:

determining the category associated with the Web page based upon information contained within the Web page.

3. The method of claim 2 wherein the determining step comprises parsing a URL of the Web page and designating the category based upon information in the URL.

4. The method of claim 2 wherein the determining step comprises reading a category ID contained in the Web page.

5. The method of claim 1 wherein the applying step comprises:
applying information maintained on the user computer to at least a portion of the set of presently active surveys, provided by a survey list server, to identify potentially applicable surveys.

6. The method of claim 5 wherein the information maintained on the user computer comprises data identifying previous on-line advertisement exposure.

7. The method of claim 1 wherein the networked server is a content delivery network server.

8. The method of claim 7 wherein the content server is one of a set of content delivery network servers containing a replicated copy of the survey recruitment definition.

9. The method of claim 8 wherein the survey recruitment definition is generated by a survey server that is separate and distinct from the content delivery network servers.

10. The method of claim 1 further comprising applying a tag rate-based test at the user computer, wherein passing the tag rate-based test is a precondition for issuing the request for a survey invitation.

11. The method of claim 1 further comprising: presenting, after the receiving the survey invitation, the survey invitation at the user computer.

12. The method of claim 11 further comprising: setting an indicator value on the user computer indicative of the user computer performing the presenting the survey invitation.

13. A system for administering on-line surveys on a network including:
a source of downloadable survey recruitment definitions and
a user computer including a computer-readable medium including computer-executable instructions for facilitating performing the steps of:
acquiring, in accordance with receiving and processing a survey recruitment tag within a Web page, a survey recruitment definition, from a networked server, wherein the survey recruitment definition includes executable logic for requesting a survey invitation;
executing the survey recruitment definition and issuing a request to a survey logic server to specify a survey invitation, wherein the request to the survey logic server identifies a category; and
receiving the survey invitation, the survey invitation being determined by the survey logic server based upon the category specified in the request and a set of presently active surveys.

14. The system of claim 13 wherein the executing step comprises:
determining the category associated with the Web page based upon information contained within the Web page.

15. The system of claim 14 wherein the determining step comprises parsing a URL of the Web page and designating the category based upon information in the URL.

16. The system of claim 14 wherein the determining step comprises reading a category ID contained in the Web page.

17. The system of claim 13 wherein the applying step comprises:
applying information maintained on the user computer to at least a portion of the set of presently active surveys, provided by a survey list server, to identify potentially applicable surveys.

18. The system of claim 17 wherein the information maintained on the user computer comprises data identifying previous on-line advertisement exposure.

19. The system of claim 13 wherein the networked server is a content delivery network server.

20. The system of claim 19 wherein the content server is one of a set of content delivery network servers containing a replicated copy of the survey recruitment definition.

21. The system of claim 20 wherein the survey recruitment definition is generated by a survey server that is separate and distinct from the content delivery network servers.

22. The system of claim 13 wherein the Web page specifies a tag rate, and wherein the user computer applies the tag rate while performing a tag rate-based test at the user computer, and wherein passing the tag rate-based test is a precondition for issuing the request for a survey invitation.

23. The system of claim 13 wherein the user computer is configured to perform the further step of: presenting, after the receiving the survey invitation, the survey invitation at the user computer.

24. The system of claim 23 wherein the user computer is configured to perform the further step of: setting an indicator value on the user computer indicative of the user computer performing the presenting the survey invitation.

* * * * *